United States Patent [19]
Walsh

[11] Patent Number: 5,465,342
[45] Date of Patent: Nov. 7, 1995

[54] DYNAMICALLY ADAPTIVE SET ASSOCIATIVITY FOR CACHE MEMORIES

[75] Inventor: Stephen J. Walsh, Durham, N.C.

[73] Assignee: International Business Machines Corporation, Armonk, N.Y.

[21] Appl. No.: 995,619

[22] Filed: Dec. 22, 1992

[51] Int. Cl.⁶ .................................................. G06F 12/08
[52] U.S. Cl. .................................. 395/446; 364/DIG. 1; 364/243.41; 395/460
[58] Field of Search ............................ 364/200 MS File, 364/900 MS File; 395/400, 425

[56] References Cited

U.S. PATENT DOCUMENTS

| | | | |
|---|---|---|---|
| 4,493,026 | 1/1985 | Olnowich | 395/425 |
| 4,654,782 | 3/1987 | Bannai et al. | 395/400 |
| 4,724,518 | 2/1988 | Steps | 395/425 |
| 4,802,085 | 1/1989 | Levy et al. | 395/375 |
| 4,811,209 | 3/1989 | Rubinstein | 395/425 |
| 4,833,642 | 5/1989 | Ooi | 365/49 |
| 4,905,188 | 2/1990 | Chung et al. | 395/425 |
| 4,914,582 | 4/1990 | Bryg et al. | 395/425 |
| 4,928,225 | 5/1990 | McCarthy et al. | 395/425 |
| 4,985,829 | 1/1991 | Thatte et al. | 395/425 |
| 4,991,088 | 2/1991 | Kam | 395/425 |
| 5,014,195 | 5/1991 | Farrell et al. | 395/425 |
| 5,025,366 | 6/1991 | Baror | 395/425 |
| 5,029,070 | 7/1991 | McCarthy et al. | 395/425 |
| 5,029,126 | 7/1991 | Yamaguchi | 365/49 |
| 5,043,885 | 8/1991 | Robinson | 395/425 |
| 5,091,851 | 2/1992 | Shelton et al. | 395/425 |
| 5,113,510 | 5/1992 | Hillis | 395/425 |
| 5,210,842 | 5/1993 | Sood | 395/425 |
| 5,301,296 | 4/1994 | Mohri et al. | 395/425 |
| 5,367,653 | 11/1994 | Coyle et al. | 395/400 |

OTHER PUBLICATIONS

Mark D. Hill, Evaluating Associativity in CPU Caches, IEEE Transactions on Computers, vol. 38, No. 12, pp. 1612–1630, 1989.

Mark D. Hill, A Case for Direct–Mapped Caches, Computer, vol. 21, Issue 12, pp. 25–40, Dec. 14, 1988.

N. P. Jouppi, "Improving Direct–Mapped Cache Performances by the Addition of a Small Fully–Associative Cache and Prefetch Buffers," *1990 Proceedings*, CH2887–8/90/0000/10364, pp. 364–373, Aug. 1990.

*Primary Examiner*—Eddie P. Chan
*Assistant Examiner*—Matthew M. Kim
*Attorney, Agent, or Firm*—Jerry W. Herndon

[57] ABSTRACT

A memory cache system for high speed computers provides adaptive set associativity by means of which the degree of associativity of the cache is temporarily and dynamically increased in response to the behavior of the system. More particularly, one or more microcaches is temporarily assigned to a particular location in the main cache memory in response to frequent probes and misses at that location. The temporarily assigned microcache increases the set associativity of that particular location until the microcache is assigned to another location. The reassignability of the microcache reduces the total cache size required as well as the complexity of the control circuitry needed to manage the cache. A cache miss threshold is established which must be exceeded before a location is assigned the microcache, and the microcache remains assigned for only a fixed number of cache accesses called the window size. A least recently used replacement algorithm is used to overwrite entries in the cache.

11 Claims, 7 Drawing Sheets

STATE DIAGRAM
ADAPTIVE SET ASSOCIATIVE CACHE
MEMORY ACCESS

FIG. 1

CACHE MEMORY ORGANIZATION
(PRIOR ART)

FIG. 2

CACHE MEMORY ORGANIZATION
WITH ADAPTIVE SET ASSOCIATIVITY

FIG. 3

FIG. 4
ADAPTIVE SET ASSOCIATIVE CACHE DESIGN
MEMORY ACCESS CIRCUITS

FIG. 5
ADAPTIVE SET ASSOCIATIVE CACHE DESIGN
WINDOWING AND MISS COUNTING

FIG. 6
STATE DIAGRAM
ADAPTIVE SET ASSOCIATIVE CACHE
MEMORY ACCESS

FIG. 7
STATE DIAGRAM
ADAPTIVE SET ASSOCIATIVE CACHE
CACHE UPDATING

FIG. 8
STATE DIAGRAM
ADAPTIVE SET ASSOCIATIVE CACHE WINDOWING

DYNAMICALLY ADAPTIVE SET ASSOCIATIVITY FOR CACHE MEMORIES

TECHNICAL FIELD

This invention relates to cache memories and, more particularly, to adaptively modified set associativities of such cache memories in response to the dynamic utilization of such caches.

BACKGROUND OF THE INVENTION

A cache memory is a small (compared to the main memory), high speed buffer memory which is located between the central processing unit (CPU) of a modern digital computer and the main memory, and as close to the CPU as possible. The cache memory duplicates and temporarily holds portions of the contents of the main memory which are currently in use or expected to be of use by the CPU. The advantage of the cache memory lies in its access time, which is generally much less than that of main memory, e.g., five to ten times less. The cache memory permits the associated CPU to spend substantially less time waiting for instructions and operands to be fetched and/or stored, permitting a much lower effective memory access time and thereby resulting in an increase in efficiency.

For example, when instructions or data are accessed from the computer main memory, it has been found that these instructions or data have a high likelihood of being required again in the near future. To take advantage of this high re-use probability, the accessed instruction or data is stored in the local, fast cache memory where it can be accessed much faster than from the main memory. The use of a cache memory can give an overall access time much closer to the speed of the cache memory than to the speed of the main memory.

Every time an instruction or data access is requested by the CPU, the cache memory is checked to see if the requested item is in the cache memory. If it is, it is called a cache "hit" and the item is retrieved from the cache memory. If the item is not in the cache memory, it is called a cache "miss" and the item must then be retrieved from the main memory. The instruction or data to be accessed is called the "target." The effectiveness of the cache is measured primarily by the hit ratio, i.e., the fraction of targets which produce a hit, but another significant parameter of the cache memory is the mean time required to access the target when a hit occurs.

In order to increase the number of cache hits, it is known to increase the cache size so that the number of items available in the cache is larger, increasing the likelihood of a hit. Unfortunately, the larger the cache, the more complex the addressing of the cache itself and hence the lower the mean cache memory access time. In addition, larger caches are more costly, requiring larger chip areas, more power and more cooling.

The simplest technique for increasing the hit ratio of cache memories is the direct mapped cache where many main memory locations map into one and only one cache location. Another cache technique to increase the hit ratio is the set associative cache. Here, many locations in the main memory map to a few locations in the cache. Increasing the number of information elements per associative set generally increases the hit ratio. Such increases in associativity, however, produce access delays and, moreover, are costly in the amount of chip area needed and in design complexity. Modern single chip central processing units have limited amounts of space for such cache memories and cache control circuitry. Generally, a large cache with a high hit ratio depends for its effectiveness more on short access times associated with low associativity, while a small cache having a lower hit ratio benefits more from higher levels of associativity.

The value of cache memories depends on the property of "locality" in computer memory accesses. Such locality is temporal as well as spatial. That is, over short periods of time, a computer program generally distributes memory references non-uniformly over the memory address space, concentrating such memory references to relatively small localities in the address space. In addition, memory references tend to remain largely the same for long periods of time. Spatial locality results from the tendency to locate data in contiguous arrays and instructions in sequential locations. Temporal locality results from the tendency to reuse data and instructions, for example in loops.

A major problem, then, is to increase the hit rate of cache memories used with computer central processing units without requiring excessive space to accommodate such cache memories or to accommodate the logic circuitry necessary to control such cache memories. More particularly, it is desirable to achieve the advantages of higher degrees of associativity in a cache buffer without suffering all of the usually associated penalties of complexity and large cache chip areas.

SUMMARY OF THE INVENTION

In accordance with the illustrative embodiment of the present invention, the degree of set associativity of the cache is made adaptive. That is, the set associativity of the cache is temporarily increased by dynamically modifying the set size of the cache based on the cache performance. More particularly, if a particular cache location is accessed frequently and experiences several misses, then a dynamic increase in the set associativity of that cache location is used to increase the hit ratio of the cache. The increase in set associativity improves the hit ratio of the cache while the reassignability of a single or a small number of auxiliary caches minimizes the size and complexity of the associative cache.

More specifically, one or more small auxiliary microcaches are provided which can be temporarily and dynamically assigned to locations in the main cache memory, thereby increasing the set associativity of that cache location. The increased set associativity of that cache location increases the hit ratio of the overall cache without adding excessively to the size of the cache or to the control circuitry necessary to manage the cache.

In accordance with one feature of the present invention, the microcache is not assigned to a main cache location until that location has suffered a sufficient number of misses to exceed a preselected miss threshold. The use of a miss threshold insures that the microcache is assigned to the cache location where it will do the most good, i.e., will eliminate the most misses.

In accordance with another feature of the invention, the microcache remains attached to a particular main cache location for a limited period of time corresponding to a preselected number of cache accesses called the "window size." A limited window size insures that one cache location will not monopolize the microcache to the detriment of overall cache operation. Once the window size has been reached, the microcache is released and is free to be assigned to a different main cache location which has exceeded the miss threshold.

In accordance with yet another feature of the invention, the cache location to be replaced when a cache miss occurs is determined by a least recently used (LRU) algorithm that ensures that the cache location which has not been accessed for the longest time is chosen. Such a least recently used algorithm ensures that the overwritten information is information which is very unlikely to be accessed in the future.

An adaptive set associativity cache in accordance with the present invention increases the hit ratio of the cache by providing increased set associativity when and where such an increase is desirable. At the same time, the large increase in control circuitry which would be necessary to support continuous high set associativity is avoided by providing increased set associativity for only one or a small number of cache locations, and only for a limited period of time.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
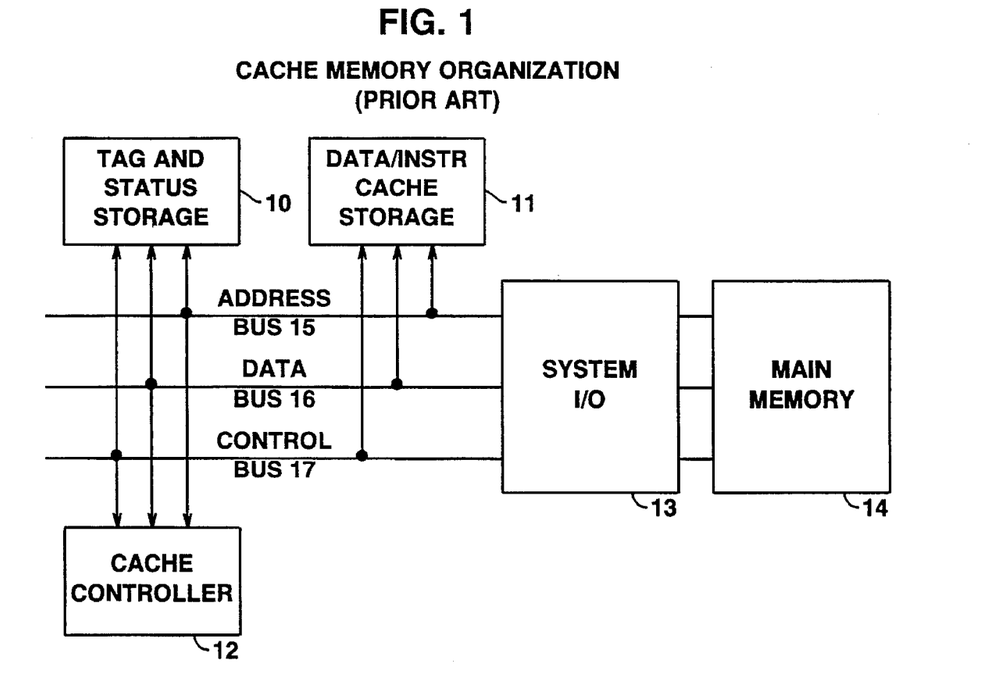
FIG. 1 shows a general block diagram of a prior art cache memory architecture for improving the performance of a cache memory in a data processing system.

In FIG. 1 there is shown a general block diagram of a prior art digital computer architecture using a cache memory to reduce the average access time to the main memory of the computer. The cache memory of FIG. 1 comprises a local (to the central processing unit, CPU), high speed cache memory 11, a tag and status storage circuit 10 and a cache controller 12. These elements (10–12) are interconnected with each other by means of three busses, an address bus 15, a data bus 16 and a control bus 17. These three busses 15–17 are multibit, universal access busses and are also used to connect elements 10–12 to the CPU (not shown) and the computer system input/output circuits 13 which, in turn, connect busses 15–17 to the computer main memory 14.

Cache memory 11 is a small (compared to main memory 14), high speed memory located near the central processing unit (CPU). The benefit of a cache memory is based on the principle of locality. That is, data or instructions which have been recently accessed from main memory 14 will be more likely to be accessed again in the near future than are data or instructions at other locations. The principle of locality is based on the fact that data and instructions are often reused. By placing recently accessed information in the smaller high speed cache memory 11, the slower speed main memory 14 can thus appear to have almost the same speed as the cache memory 11.

Cache controller 12 is responsible for the management of the tag and status store 10 and the cache memory 11 and for implementing the cache contents replacement algorithm. Tag and status store 10 contains both tags and status bits. A tag is the most significant digits of the actual address, in main store 14, of the data or instructions in cache memory 11. This tag is used by controller 12 to determine whether or not the information being requested by the CPU is already in cache store 11. The status bits in store 10 have several purposes, depending on the replacement algorithm used and whether a write-through or write-back policy is in place. Cache store 11 is organized by blocks of storage and, typically, the blocks are organized by words. The number of words in a block is ordinarily a power of two to facilitate binary addressing.

There are two general types of cache operation, "direct mapped" cache architecture or an associative cache architecture. In a direct mapped cache, the addresses for the main memory 14 are mapped directly, on a one-for-one basis, into the cache memory 11. An example will be helpful. Assume that, for a direct mapped cache, the main memory 14, has an address width of 32 bits, permitting 4 gigabytes of byte addressable main memory. Also assume that a data or instruction word in main memory 14 has a width of 32 bits and that the main memory 14 is divided into blocks with a block size of four words. Addresses for main memory 14 can then be mapped into cache memory 11 as follows. The four least significant address bits can be used to select between the sixteen bytes of each fourword block in main memory 14 and between the corresponding sixteen bytes of each four-word block in cache store 11. The next four least significant address bits can be used to select one of the sixteen four-word blocks in memory 14 and cache store 11. The cache store 11 then would comprise an array of sixteen 16-byte blocks (32 bits by 32 bits=1024 bits=1 kilobit (1 Kb). The remaining 24 bits of the main memory address would constitute the tag and would be stored in the tag portion of tag and status store 10. Each of the sixteen blocks of four-word storage in cache store 11 would then have a 24-bit tag associated with it which can be accessed from tag and status store 10 with the same four-bit block address used to access the actual data or instructions from cache store 11. The tag is used, along with the block address, to determine if the requested main memory contents are already present in the cache store 11. The status bits in store 10 can be used, for example, to indicate that the data stored in the corresponding address in cache store 11 are valid, e.g. simple parity bits or an error check code. Other kinds of status information are also possible, as will be described below.

The cache memory organization of FIG. 1 operates as follows. When the central processing unit (CPU) places an address of desired information on address bus 15, the cache controller 12 extracts the block address bits (bits 5 though 8)

from the address and uses this block address to access the associated tag in tag and status store 10. If this tag matches the 24 most significant bits of the address on bus 15, then a cache "hit" has occurred and the word in cache store 11 beginning at the byte address of the four least significant bits of the address on bus 15 is read from cache store 11 and delivered to the CPU on data bus 16. If the stored tag does not match the 24 most significant bits of the address on bus 15, then a cache "miss" has occurred, and cache controller 12 requests the addressed information from main memory 14. This information, in turn, is then placed in the block of cache store 11 identified by the block address portion of the address on bus 15, replacing the information previously there. The block address portion of memory addresses is called a SET.ID. The SET.ID therefore identifies the block location of information both in main memory 14 and in cache store 11. This organization in which there is a one-for-one mapping of cache store addresses into main memory addresses is called a direct mapped organization.

Another method of organization of the cache store 11 is to provide a plurality of blocks of storage locations for each SET.ID. This latter type of organization is called a set associative organization. That is, if each SET.ID has two tags (blocks) associated with it, the organization would be called two-way set associative cache, if each SET.ID has four tags (blocks) associated with it, the organization would be called four-way set associative caches, and so forth. If all of the tags in the cache store 11 were associated with a single SET.ID, the organization would be called a fully associative cache. Direct mapped and two-way set associative organizations are the most common cache organization used today, but some higher order associativities have also been used.

The advantages of a direct mapped cache architecture are the simplicity of the control mechanism and the smaller size of the cache store 11. The principal disadvantage of the direct mapped cache is the higher miss ratio experienced with this smaller cache size. On the other hand, while set associative architectures increase the hit ratio, they do so at the cost of increased cache complexity and increased physical size of the cache store. Moreover, the larger the set associativity, the more control logic that is required. The more control logic, the more time it takes to access the store, thereby negatively impacting overall performance. A law of diminishing returns is therefore associated with higher set associativities. The present invention is an attempt to provide a cache architecture which combines the simplicity of direct mapped cache with the improved performance of the set associative cache. This new cache architecture is called the adaptive set associative cache architecture and will be described in connection with FIG. 2.

Figure 2:
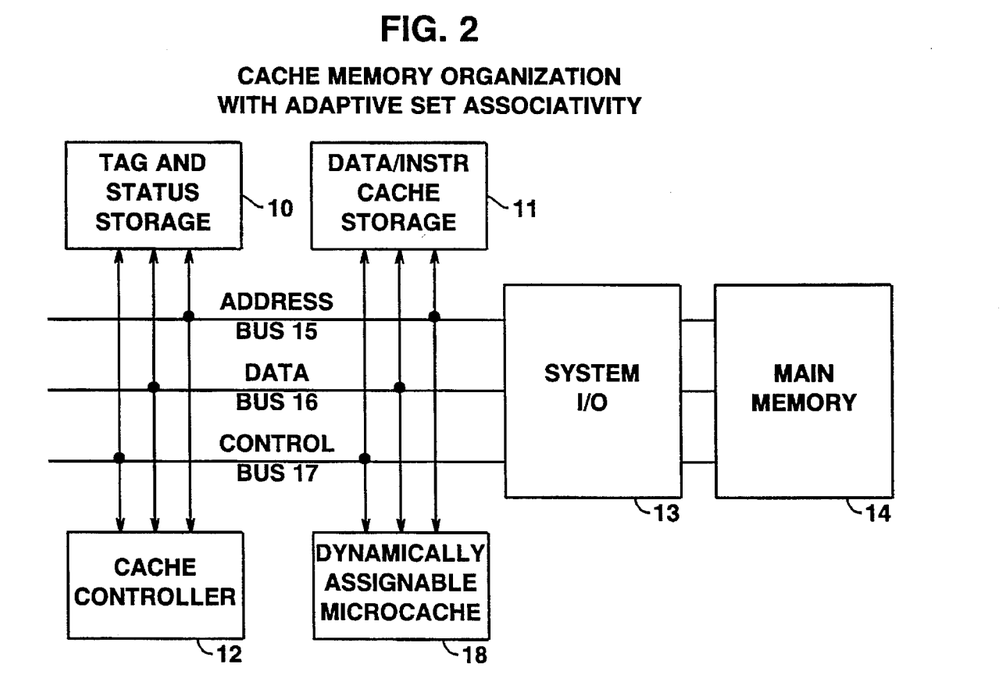
FIG. 2 shows a general block diagram of an adaptive set associativity cache memory architecture in accordance with the present invention showing the use of a dynamically assignable microcache.

In FIG. 2 there is shown a general block diagram of a cache memory organization with adaptive set associativity in accordance with the present invention. In FIG. 2, as in FIG. 1, the cache memory comprises tag and status store 10, cache store 11 and cache controller 12. Also as in FIG. 1, these elements 10–12 are interconnected by address bus 15, data bus 16 and control bus 17. Buses 15–17 also connect the cache memory 10–12 to main memory 14 by way of system input/output circuits 13 and to a central processing unit, not illustrated. Included in the adaptive set cache system of FIG. 2, and not found in the prior art architecture of FIG. 1, is a dynamically assignable microcache 18.

The adaptive set associativity architecture of FIG. 2 has the ability to dynamically modify the set size based on the performance of the cache. That is, if a particular cache tag is accessed frequently, and if it experiences several misses, then a dynamic increase in set associativity takes place. This increase in set associativity takes place only with respect to the cache tag experiencing the misses and improves the hit ratio of that cache tag. Such an increase in set associativity is implemented by dynamically and temporarily attaching the microcache 18 to a single SET.ID location in tag and status store 10 and cache store 11. The microcache 18 is a very small cache which can be logically attached to any SET.ID location in the main cache store 11 and thereby increase the set size for that SET.ID.

Before proceeding with a more detailed description of the adaptive set associative architecture of the present invention, it is useful to define several concepts useful in the implementation of such adaptive set associative architecture. In operation, the cache controller 12 of FIG. 2 monitors the number of misses for all SET.IDs to see if any such SET.ID has reached a preselected "miss threshold." Only if the miss threshold is exceeded will the microcache 18 be assigned to the most recently accessed SET.ID that has reached the miss threshold. Indeed, it is possible to provide more than one microcache 18 and to assign such microcaches to other SET.IDs subsequently reaching the miss threshold. Since the implementation of such multiple microcache arrangements will be straight forward to those skilled in the art from the following description, only a single microcache embodiment will be described below.

Microcache 18 of FIG. 2 remains attached to a particular SET.ID for a limited time to allow other SET.IDs to obtain the benefit of increased set associativity. To this end, the microcache 18 remains attached to a particular SET.ID only for a preselected number of cache accesses. This number is called the "window size" and is selected to optimize the benefit of the adaptive set associativity. When the window size value is reached, the microcache 18 is released and becomes available for assignment to another SET.ID which has reached the miss threshold.

If a cache miss occurs in the adaptive set system, it is necessary to determine which one of the multiple tags associated with the SET.ID suffering the cache miss will be overwritten by the new information retrieved from the main memory 14 of FIG. 2. One algorithm for determining the replacement SET.ID is a "least recently used (LRU)" algorithm. One or more status bits are reserved in tag and status store 10 to keep track of the order in which the tags therein with a common SET.ID were accessed. The oldest accessed tag for that SET.ID (the least recently used tag) is selected for replacement. This strategy ensures that the tag being replaced is one with a low likelihood to be accessed in the future.

Figure 3:
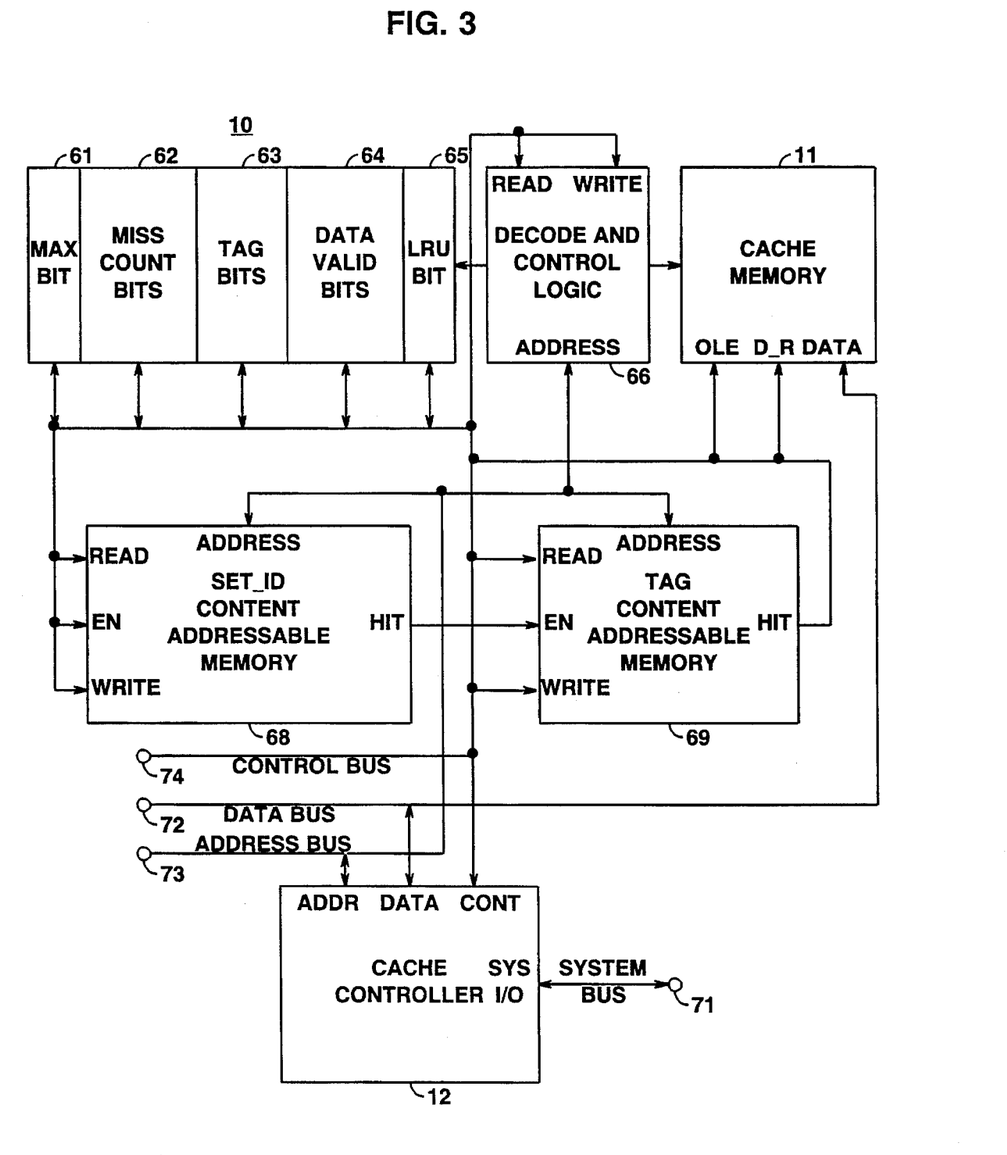
FIG. 3 shows a more detailed block diagram an adaptive set associativity cache memory architecture in accordance with the present invention showing the use of content addressable memories to facilitate the determination of cache hits in a dynamically assignable microcache.

In FIG. 3 there is shown a more detailed block diagram of an adaptive set associative architecture in accordance with the present invention. In FIG. 3, tag and status store 10 corresponds to store 10 of FIG. 2 and cache memory 11 corresponds to cache store 11 in FIG. 2. SET.ID content addressable memory 68 (CAM 68) and tag content addressable memory 69 (CAM 69) comprise portions of the microcache 18 of FIG. 2. Cache controller 12 corresponds to cache controller 12 in FIG. 2 while decode and control logic circuits 66 provide the necessary control circuits for accessing stores 10 and 11.

Tag and status store 10 in FIG. 3 comprises a storage device in which bits 62 are reserved for the miss count, recalling that the number of cache misses is accumulated for each tag in store 10 since the microcache 18 (FIG. 2) was last assigned. This miss count must exceed a preselected miss count threshold before a SET.ID will be considered for assigning the microcache. As an example, nine miss count bits would permit a maximum miss count of up to 512. The miss count threshold, however, may be any value less than the maximum. The miss count bits 62 of a particular SET.ID are reset to zero every time that the microcache is assigned to that SET.ID. This allows other SET.IDs to vie for the microcache without competition from the last assigned SET.ID, preventing one SET.ID from monopolizing the microcache. Every time a SET.ID is accessed, the value of the miss count is read and, depending on the values of the MAX bit 61 and a MISS signal, incremented by one. The MAX bit 61 indicates that the associated SET.ID has exceeded the miss count threshold and hence is now a candidate for microcache assignment. Like the miss count bits, the MAX bit 61 is also reset to zero every time the microcache is assigned. The MISS signal is, of course, an indication of a current cache miss for that SET.ID.

Tag and status store 10 also includes tag bits 63, representing that portion of the main memory address excluding the least significant bits representing the block SET.ID and the byte address. The status portion of the store 10 includes data valid bits 64, indicating that the data recovered from the main memory address corresponding to this SET.ID is valid. These data valid bits may simply be parity bits or may be a more complex error detection code. The LRU (least recently used) bit 65 indicates whether or not the corresponding entry in the microcache and the cache memory 11 was accessed last. This bit is used by the replacement algorithm to determine where new information, required by a cache miss, is to be overwritten in the cache.

Decode and control logic circuit 66 translates read and write commands from the control bus attached to terminals 74 and addresses from the address bus attached to terminals 73 into the necessary control signals to access both tag and status store 10 and cache memory 11. Recall that the SET.ID portion of the address is used as an index into each of these memories 10 and 11. Decode and control logic 66 selects the SET.ID bits from the address at terminals 73 and uses these SET.ID bits to retrieve (or write) the corresponding entries in stores 10 and 11. The entry in store 10 is, of course, the tag and status information corresponding to that SET.ID. The entry in store 11, on the other hand, is the actual data or instructions previously retrieved from main memory 14, or the data or instructions just retrieved from main memory 14 and to be stored in cache memory 11.

SET.ID CAM 68 stores the SET.ID of the cache memory 11 entry to which the microcache is currently assigned. Tag content CAM 69 contains the current tag values for each word of the block of data or instructions corresponding to the SET.ID stored in CAM 68. Cache controller 12 contains the control circuitry for controlling the balance of the components of FIG. 3.

Figure 4:
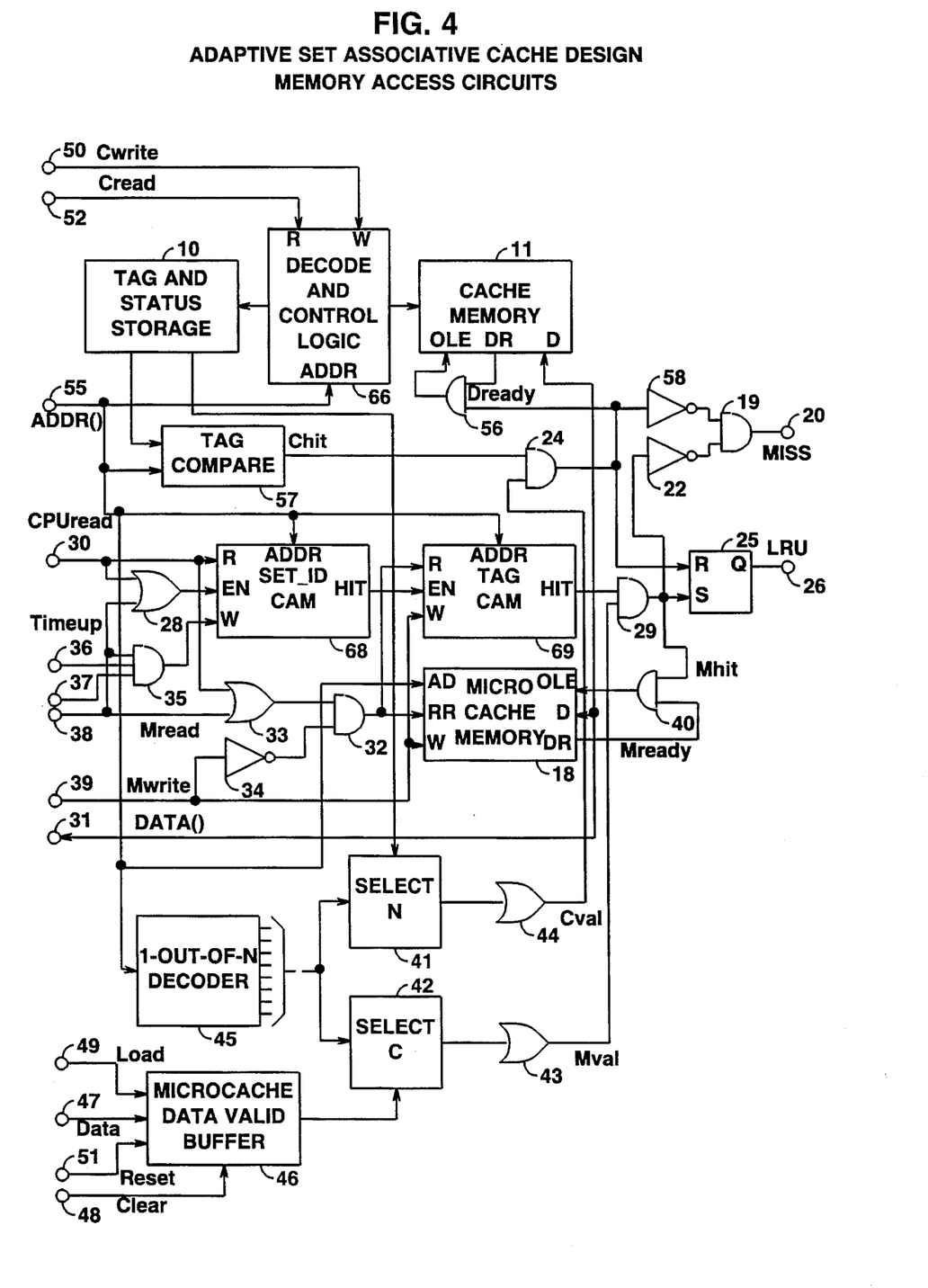
FIG. 4 shows a detailed circuit diagram of one portion of the adaptive set associativity cache memory of FIG. 3.
Figure 5:
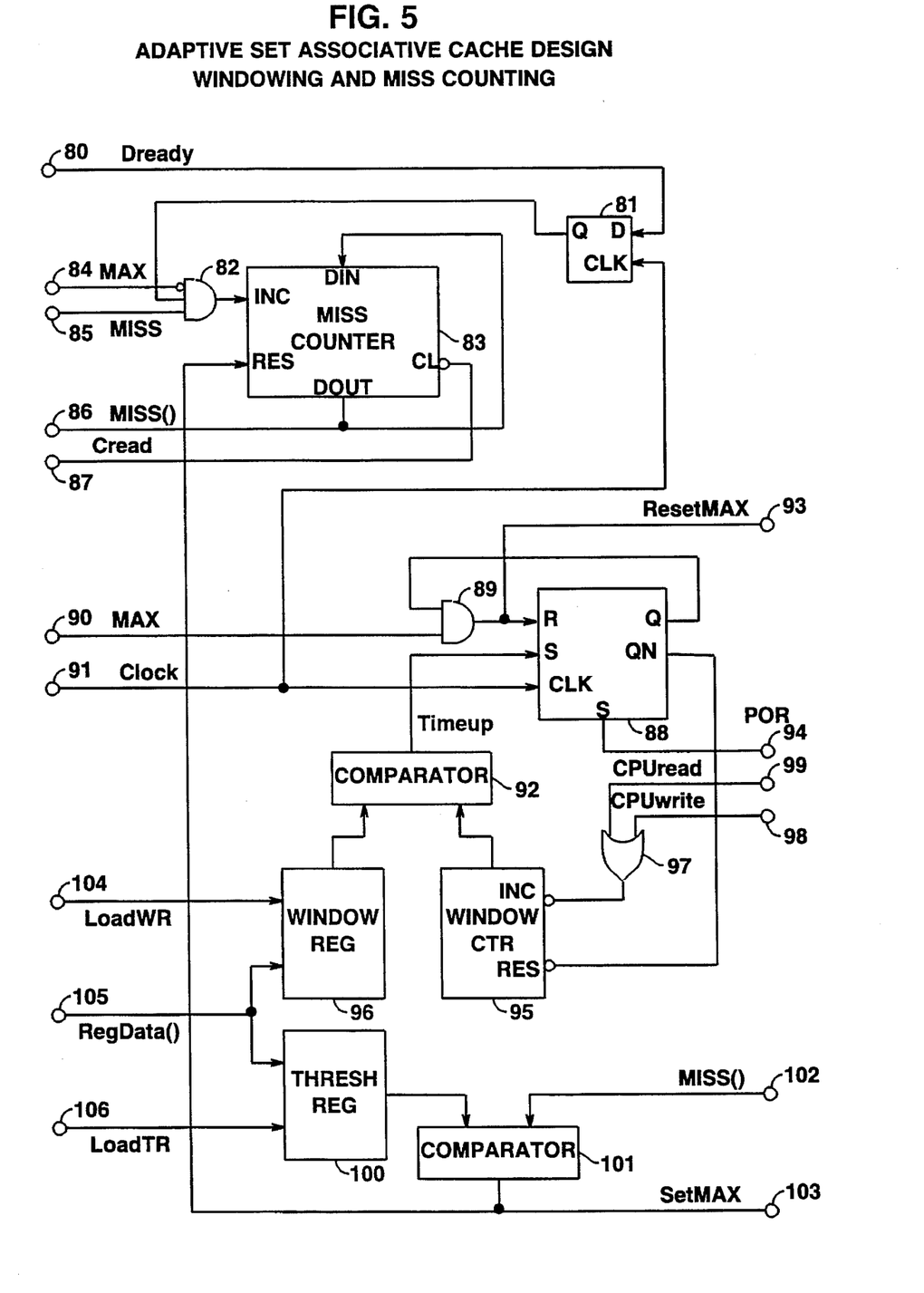
FIG. 5 shows a detailed circuit diagram of another portion of the adaptive set associativity cache memory of FIG. 3.

In FIGS. 4 and 5 there is shown a detailed circuit diagram of an adaptive set associative cache memory architecture in accordance with the present invention comprising a tag and status store 10 and a cache memory 11 corresponding, respectively, to tag and status store 10 and cache memory 11 in FIG. 3. SET.ID CAM 68 and tag CAM 69 of FIG. 4 similarly correspond, respectively, to CAMs 68 and 69 of FIG. 3. If the CPU places a CPUread on the control bus 17, this signal appears at terminal 30 of FIG. 4 to initiate a memory access cycle. At the same time, the CPU places the address of the main memory 14 (FIG. 2) on address bus 73 which address appears at terminals 55 of FIG. 4. Using this address, the SET.ID CAM 68 uses the SET.ID portion of the address at terminals 55 to query CAM 68 to see it this SET.ID is stored in CAM 68. At the same time, a Cread signal at terminal 52 is used in decode and control logic circuit 66 to access tag and status store 10. The tag of the address at terminals 55 is compared, in compare circuit 57, to the tag addressed in tag and status store 10, using the SET.ID portion of the address to access store 10. If a match occurs in CAM 68, the hit output enables tag CAM 69 where the tag portion of the address at terminals 55 is compared to the tag in CAM 69. If another hit occurs, AND gate 29 is partially enabled. If, on the other hand, a tag match occurs in compare circuit 57, a Chit signal is applied to partially enable AND gate 24. AND gates 24 and 29 are fully enable by data valid signals from OR gates 44 or 43, respectively.

While the SET.ID and tag are being used to establish cache hits as described above, the data valid bits stored in tag and status store 10 are applied to selector 41. At the same time, the byte address portion of the address at terminals 55 is applied to a 1-out-of-N decoder 45. The output of decoder 45, in turn, is used in selector 41 to select the appropriate data valid bits from tag and status store 10 and apply them to OR gate 44. The output of OR gate 44 forms the other input to AND gate 24. Similarly, a a microcache data valid buffer 46 contains similar data valid bits for the data in microcache memory 18. The same output of decoder 45 is also applied to selector 42, to which the data valid bits in buffer 46 are applied. The data valid bits selected in selector 42 are applied to OR gate 43. If the data valid bit is a "1," the Mval signal is applied to AND gate 29. If AND gate 29 is fully enabled, LRU flip-flop 25 is set, producing an LRU signal at the Q output of flip-flop 25 which is applied to output terminal 26. If, on the other hand, AND gate 24 is fully enabled, LRU flip-flop 25 will be reset, removing the Q output and terminating the LRU signal at output terminal 26. This LRU signal is used to change the marking of this tag as the "least recently used" cache location in LRU bit 65 in tag and status store 10 (FIG. 3). That is, if this cache location had previously been marked as a least recently used cache location, this LRU bit is changed to reflect the recent access to this location.

The data valid bits in buffer 46 are introduced from terminals 47 in response to control signals on terminal 49 (load), terminal 51 (reset) and terminal 48 (clear). These data valid bits are created in the same way and at the same time that the data valid bits stored in tag and status store 10 are created. That is, the data recovered from the main memory 14 is analyzed to determine if its parity is appropriate and this decision turned into a data valid (or invalid) bit which is stored in buffer 46 or store 10.

If a valid data hit occurs in CAMs 68 and 69, as indicated by the output of AND gate 29, AND gate 40 is partially enabled. AND gate 40 is fully enabled by a "data ready" signal from CAM 18 (Mready) to introduce an "output latch enable (OLE)" signal into CAM 18 to read the data corresponding to this address (from terminals 55) from CAM 18 and onto data terminals 31 where it can be delivered, by way of data bus 16 (FIG. 2), to the CPU. Similarly, if a valid data hit occurs in tag and status store 10, as indicated by the output of AND gate 24, AND gate 56 is partially enabled. AND gate 56 is fully enabled by a data ready signal from cache memory 11 (Dready), to introduce an output latch enable signal into cache memory 11 to read the data corresponding to this address (from terminals 55, using the Cread signal at terminal 52 and decode and control logic circuit 66) from cache memory 11 onto data terminals 31 and thence to the CPU via data bus 16 of FIG. 2. Thus, if a valid hit occurs in either the main cache memory 11 or the microcache memory 18, the requested data item is delivered to the CPU from the appropriate one of cache memories 11 or 18.

If a hit does not occur in either tag compare circuit 57 or in CAMs 68 and 69, neither of AND gates 24 and 29 is enabled. This condition is detected by inverters 58 and 22 and applied as "1" inputs to AND gate 19. The output of AND gate 19, applied to terminal 20, is a MISS signal, indicating that the requested target information is nowhere in the cache memory and must be accessed from the main memory. A main memory access cycle is therefore initiated. In response to the address on address bus 15 (FIG. 2) the main memory 14 delivers the addressed block of information on data bus 16. In FIG. 4, this data appears at terminals 31. If a Cwrite signal is present at terminal 50 when the MISS signal is present, indicating that the miss occurred in the main cache memory 11, decode and control logic circuit 66 permits the data itself to be written into cache memory 11 under the control of the same SET.ID portion of the address at terminals 55.

If the cache miss has taken place with respect to microcache 18, and if microcache 18 contains LRU data, then an Mwrite signal at terminal 39 permits the tag portion of the address at terminals 55 to be written into CAM 69. At the same time, the data or instructions at terminals 31 are written into microcache memory 18 in response to the Mwrite signal.

Note that SET.ID CAM 68 is enabled by OR gate 28 in response to either a CPUread signal at terminal 30 or an Mread signal at terminal 38. That is, CAM 68 is enabled for reading for testing new CPU initiated probes for targets (CPUread) or to read the data out of the microcache 18 (Mread). Writing into CAM 68 is under the control of AND gate 35, enabled by the confluence of an Mread signal at terminal 38, a Timeup signal at terminal 36 and a MAX signal at terminal 37. The Timeup signal indicates that the window count has exceeded the window threshold. The MAX signal is taken from the status portion of the entry in tag and status store 10 (FIG. 3), indicating that the miss count has been exceeded on a previous probe.

In FIG. 5 there is shown detailed circuit diagrams of the windowing and miss counting portion of the adaptive set associativity cache of the present invention. In FIG. 5, miss counter 83 is used to count the number of cache misses, i.e., the number of times that the CPU requests data or instructions and that data or instructions is not available in the cache. This count is therefore incremented by the output of three input AND gate 82. One input to AND gate 82 is the MAX signal at terminal 84, representing the presence of the MAX bit 61 in the addressed location in tag and status store 10 (FIG. 3). The MAX is inverted before application to AND gate 82, thus not permitting an increase in the miss count for those storage locations already exceeding the miss threshold. Another input to AND gate 82 is taken from terminal 85 and represents the MISS signal derived from terminal 20 in FIG. 4, signifying a CPU memory probe for data or instructions not present in either the main cache store 11 or the microcache 18 of FIG. 4. The last input to AND gate 82 is taken from the "Q" output of D-type flip-flop 81. Flip-flop 81 is set, and reset, by the confluence of the clock signal, at terminal 91, and Dready signal from cache memory 11 in FIG. 2. This input to AND gate 82 is a timing signal which times the incrementing of miss counter 83 so as to fall in the middle of the cache read cycle.

Since each entry in the cache memory 11 must maintain its own miss count, it is necessary to retrieve the current miss count from tag and status store 10, load it into miss counter 83, increment the value of the miss count, and return the incremented miss count to the tag and status store 10. To this end, the miss count from store 10 appears on terminals 86 and is loaded into miss counter 83 at the "DIN" terminals.

After the count is incremented by the output of AND gate 82, a Cread signal at terminal 87 reads the incremented count from miss counter 83 onto terminals 86 from which the miss count can be returned to the appropriate location in tag and status store 10. The count in miss counter 83 can be reset to zero by a SetMAX signal from comparator 101, indicating that the miss count has exceeded the miss threshold.

A miss count threshold register 100 stores the value of the miss count threshold while a window register 96 stores the value of the window size during which the microcache 18 will remain attached to a particular SET.ID. In order to permit a large degree of flexibility, each of registers 96 and 100 can be loaded with any desired values by RegData signals at terminals 105 under the control of a LoadWR signal at terminal 104 (to load window register 96) or a LoadTR signal at terminal 106 (to load threshold register). While the values in window register 96 and the value in threshold register 100 are heavily dependent on the actual memory probe patterns of the application running on the computer, it has been found that a window size of 25 and a miss count threshold of 10 are appropriate for a large number of applications.

Comparator 101 compares the miss count threshold in register 100 to the miss count at terminals 102, corresponding to the miss count for the currently probed SET.ID. If the miss count exceeds the miss count threshold, comparator 101 produces a SetMAX signal at terminal 103 which can be used to set the MAX bit 61 in FIG. 3. As previously noted, this SetMAX signal is also used to reset the value of the miss count in counter 83 to zero. It is the zero value of the miss count which is subsequently returned for storage in tag and status store 10.

A window counter 95 is provided to keep track of the number of cache probes which have taken place since the last reassignment of the microcache 18. To this end, OR gate 97 combines the CPUread signal at terminal 99 and the CPUwrite signal at terminal 98 and applies the combined signal to an incrementing input to window counter 95. That is, if either a CPUread or a CPUwrite is asserted by the CPU, the window counter 95 is incremented to increase the window count by one. The window count in counter 95 is compared in comparator 92 to the window size value in window register 96. When the window count in counter 95 exceeds the window size in register 96, a Timeup signal is generated and applied to the set input of RS flip-flop 88. When thus set, flip-flop 88 produces a signal at the "QN" (not "Q") output to reset counter 95 to start a new window counting cycle to correspond with the reassignment of the microcache 18.

AND gate 89 combines a MAX signal at terminal 90 with the "Q" output of flip-flop 88 to produce a ResetMAX signal at terminal 93 which is used to reset the MAX bit 61 (FIG. 3) in tag and status store 10 for the SET.ID which is newly assigned the microcache 18. In this way, it is ensured that the SET.ID which was most recently assigned microcache 18 is not reassigned microcache 18 on the next reassignment cycle. This ResetMAX signal is also used to reset flip-flop 88, thus starting a new windowing cycle. The clock signal at terminal 91 is used to properly clock the setting and resetting of flip-flop 88.

Figure 6:
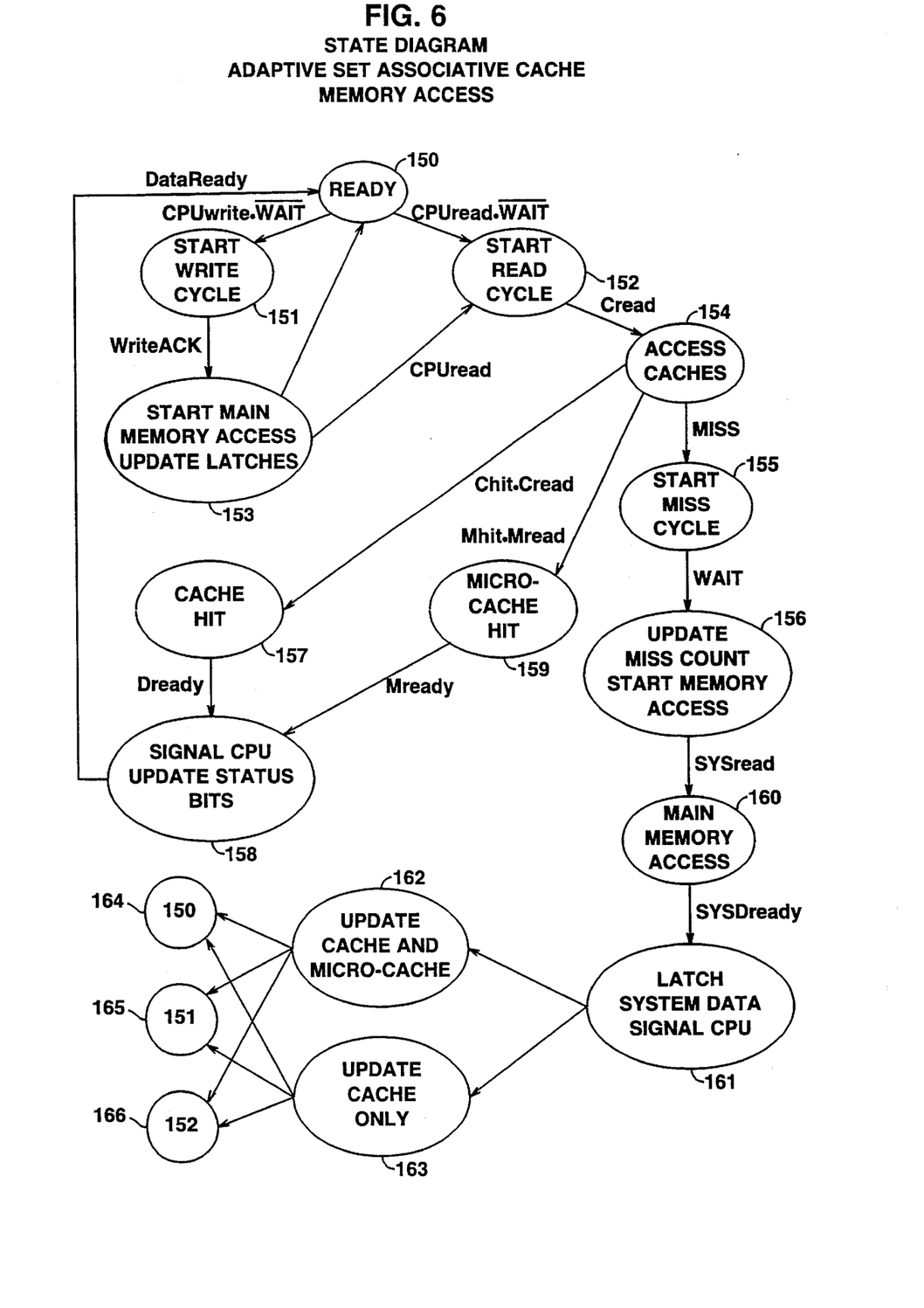
FIG. 6 shows a state diagram of the memory access processes of the adaptive set associativity cache memory of FIGS. 4 and 5.
Figure 7:
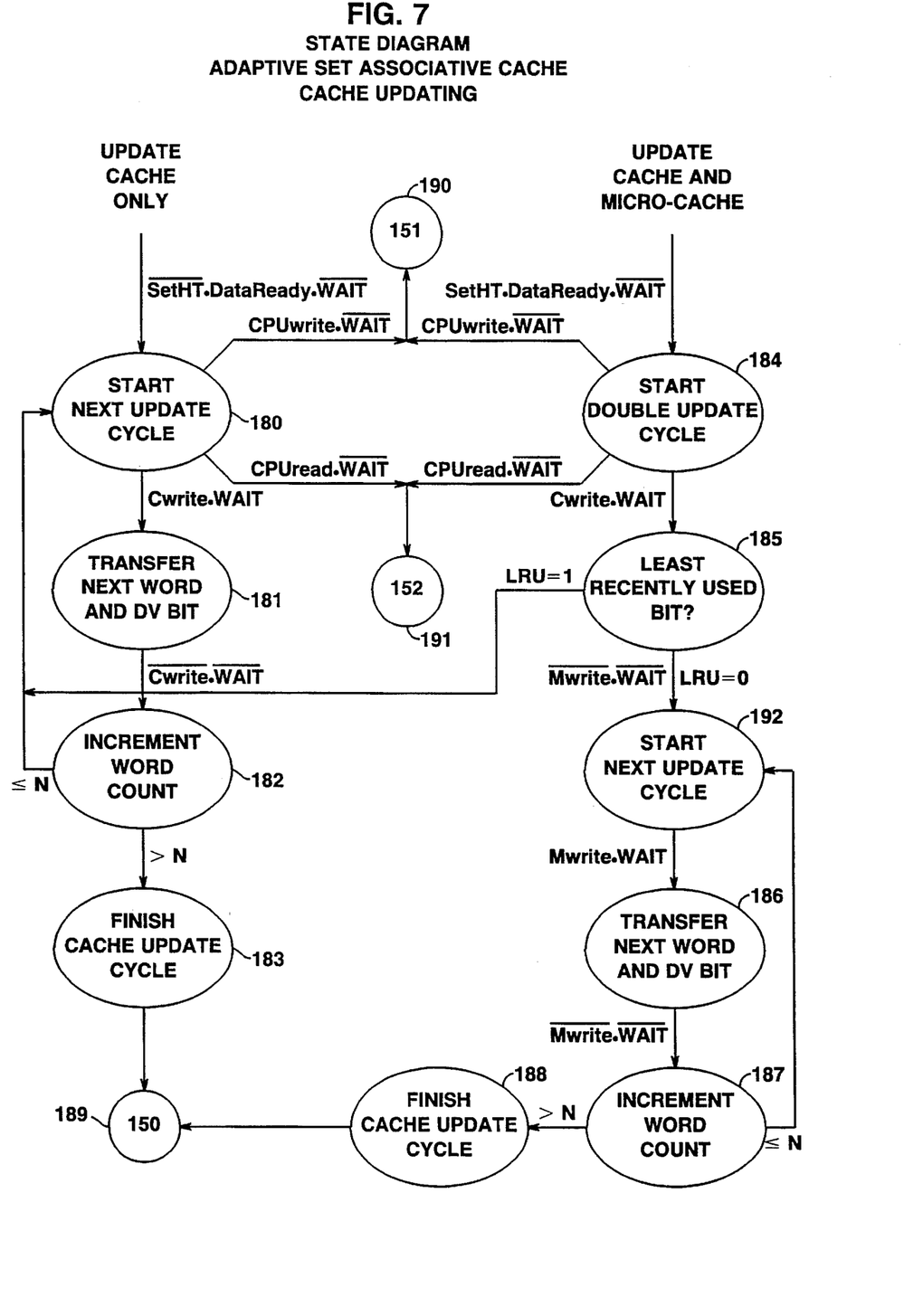
FIG. 7 shows a state diagram of the cache updating processes of the adaptive set associativity cache memory of FIGS. 4 and 5.
Figure 8:
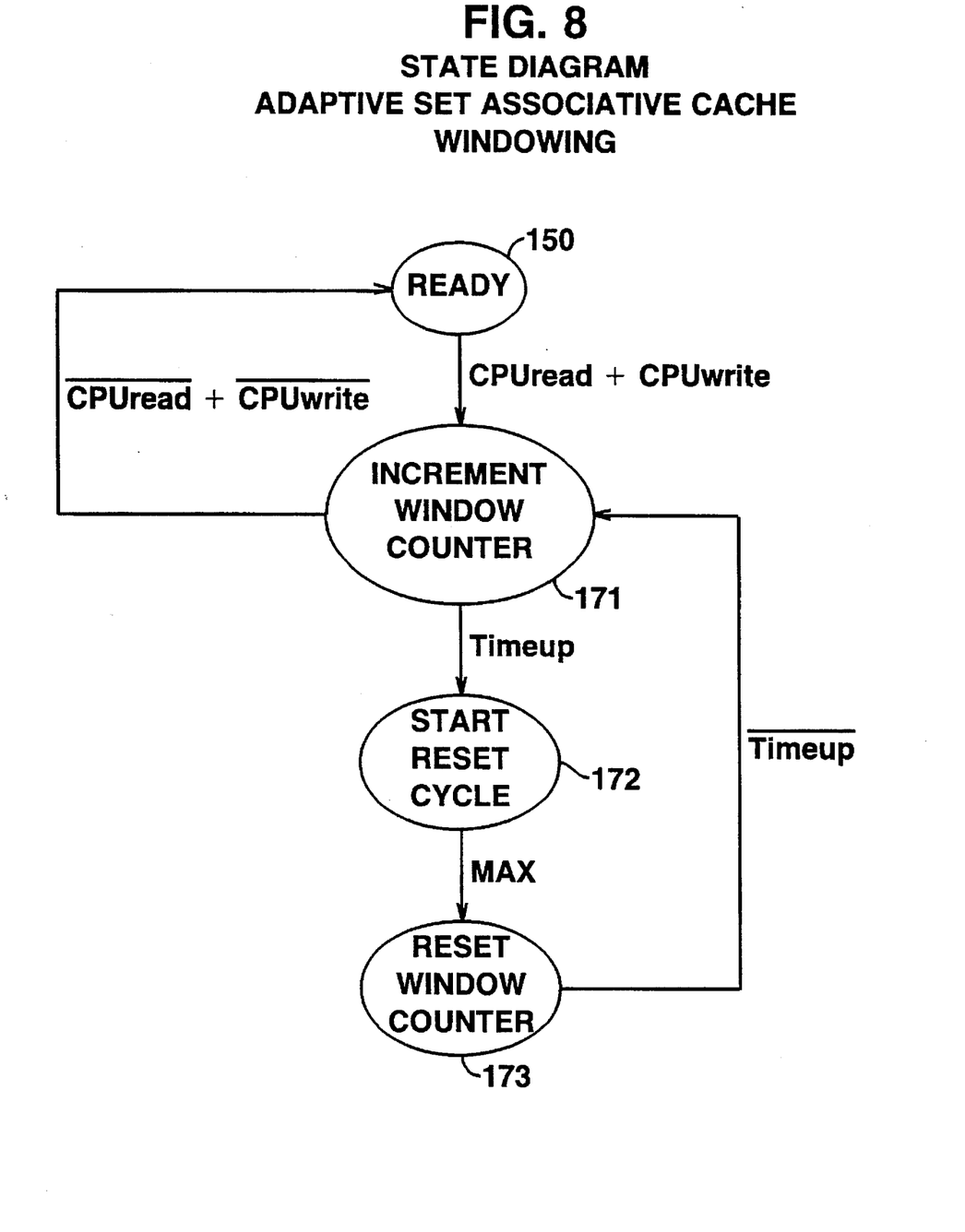
FIG. 8 shows a state diagram of the cache attachment windowing processes of the adaptive set associativity cache memory of FIGS. 4 and 5.

In FIGS. 6, 7 and 8 there are shown state diagrams summarizing the operation of the adaptive set associative (ASA) cache circuits of FIGS. 4 and 5. Initially, assume that ASA cache is in READY state 150 where the CPU is not asserting either a CPUread or a CPUwrite signal and no cache updates are in progress. Cache controller 12 generates a WAIT signal to prevent new CPU requests (CPUread or CPUwrite) from interfering with main memory accesses which are in progress. Assuming that a WAIT signal is not asserted on the control bus, the central processing unit (CPU) of the computer asserts either a CPUwrite signal (terminal 98 of FIG. 5) or a CPUread (terminal 30 of FIG. 4 and terminal 99 of FIG. 5). At the same time, the CPU places a main memory address on the address bus 15 and, for a CPUwrite, a data word on data bus 16.

If a CPUread is asserted, the START READ CYCLE state 152 is entered. At the same time, as shown in FIG. 8, the INCREMENT WINDOW COUNTER state 171 is entered, as will be described hereinafter. In response to the assertion of the CPUread, the cache controller 12 (FIG. 2) initiates a cache read by asserting Cread to enter the ACCESS CACHES state 154 of FIG. 6. In state 154, the local caches 11 and 18 are investigated, as described in detail in connection with FIG. 4, to determine if the requested data or instructions are in the local caches 11 or 18. If the data in a matching entry in cache 11 is valid, Chit is asserted which, together with the Cread, is used to enter CACHE HIT state 157. On the other hand, if the data on a matching entry in microcache 18 is valid, Mhit is asserted which, together with the Mread signal, is used to enter the MICRO-CACHE HIT state 159. When the requested data is retrieved from cache 11 (Dready), or from microcache 18 (Mready), the SIGNAL CPU AND UPDATE STATUS BITS state 158 is entered.

As described in connection with FIGS. 4 and 5, in state 158 the data is delivered from one of the local caches 11 or 18 to the data bus 16 from which the CPU will be able to pick up the requested data. At the same time, the LRU status bit 65 in tag and status store 10 is updated, using the LRU signal at terminal 26 of FIG. 4. The cache controller 12 then generates a DataReady signal which returns the system to the ready state 150 to await the next CPU activity.

If, in ACCESS CACHES state 154, it is determined that the requested information is in neither the cache 11 nor the microcache 18, then a MISS signal is asserted at terminal 20 (FIG. 4). With the assertion of this MISS signal, START MISS CYCLE state 155 is entered. In response to the entry into state 155, the cache controller 12 asserts a WAIT signal to prevent the CPU from interrupting an in progress block update. In response to this WAIT signal, the UPDATE MISS COUNT AND START MEMORY ACCESS state 156 is entered. As noted in connection with FIG. 5, the miss count is updated in the tag and status store 10 in state 156 after which the cache controller 12 asserts a SYSread signal to initiate a main memory 14 access. Therefore, in response to the SYSread signal, the MAIN MEMORY ACCESS state 160 is entered. In state 160, prior art techniques are used to retrieve the requested data or instructions from main memory 14. Note that the data from main memory 14 is retrieved a block at a time. When the first word of this data becomes available on data bus 16, SYSDready is asserted by main memory 14 to enter LATCH SYSTEM DATA AND SIGNAL CPU state 161. This data is, of course, delivered to the CPU for processing. This data, however, must also be entered into the local cache for future requests.

In state 161, it is determined whether the miss occurred in the cache 11 or in the microcache 18. If the miss occurred in the microcache 18, as indicated by an Mhit signal, UPDATE CACHE AND MICRO-CACHE state 162 is entered. On the other hand, if the miss occurred in the cache 11, as indicated by a Chit signal, UPDATE CACHE ONLY state 163 is entered. The detailed operations taking place in states 162 and 163 are described in more detail in connection with FIG. 7. In general, in states 162 and 163 data words are transferred, one at a time, from the main memory 14 to the cache store 11 or the microcache store 18. As suggested in FIG. 6, either of states 161 and 162 will be exited if either a CPUread (exit to state 152) or a CPUwrite (exit to state 151) is asserted. If the entire block is successfully entered into cache store 11 or microcache 18, READY state 150 is re-entered to begin a new memory access cycle.

If a CPUwrite signal occurs while in the READY state 150, START WRITE CYCLE state 151 is entered, assuming that a WAIT signal has not been asserted. In the START WRITE CYCLE state 151, the windowing state diagram of FIG. 8 is entered. It is assumed that the information to be written to the main memory 14 is first placed in a first-in, first-out (FIFO) buffer. This memory access policy is known as "posted write." Prior art techniques are used to update the cache contents. When the data is available in the FIFO buffer, the cache controller 12 asserts a WriteACK signal to the CPU, moving to the START MAIN MEMORY ACCESS AND UPDATE LATCHES state 153. In state 153, the main memory 14 retrieves the data from the FIFO buffer and stores the data in the main memory 14. If, during this memory write state 153, the CPU asserts either a CPUread or a CPUwrite signal, state 152 or state 151, respectively, is entered to implement the CPU request. When the main memory write cycle is complete, the READY state 150 is re-entered and the entire cycle begins anew.

In FIG. 7 there is shown a state diagram of the cache updating processes summarized in states 162 and 163 in FIG. 6. Note that information is transferred from the main memory 14 to the cache stores 11 or 18 in multiword blocks. The number of words in each block depends on many factors and has been represented by the value N. That is, each SET.ID location in cache memory 11, and microcache 18, includes at least N words of storage. The least significant bits of the memory address identify which word in the block is desired, but the entire block is retrieved, one word at a time, in an attempt to render memory accesses more efficient. This multiword memory retrieval is described in the state diagram of FIG. 7.

In FIG. 7, if state 163 has been entered (UPDATE CACHE ONLY), the confluence of the absence of a SetHT signal on lead 193, indicating that the microcache 18 is not attached to the location in main cache 11 where the new data is to be written, and a DataReady signal, indicating that the cache hit processing has been completed, and the absence of a WAIT signal, indicating that a block transfer is not in progress, causes the system to enter the START NEXT UPDATE CYCLE state 180. The cache controller 12 then asserts the Cwrite signal, to indicate that a cache writing cycle has begun, and the WAIT signal to prevent interruption of the memory transfer. In response to the Cwrite and the WAIT signals, the TRANSFER NEXT WORD AND DV BIT state 181 is entered where the next main memory word is transferred from main memory 14 to cache store 11, and the data valid bit associated with this word is entered in tag and status store 10. When this process is completed, the Cwrite and WAIT signals are removed, transferring to the INCREMENT WORD COUNT state. In state 182, the count of words transferred from main memory 14 is maintained and incremented. If the resulting count is less than or equal to N, START NEXT UPDATE CYCLE state 180 is re-entered to initiate the retrieval of the next word of the block. When all of the words of the block have been retrieved, the word count in state 182 will be greater than N and FINISH CACHE UPDATE CYCLE state 183 is entered where the cache update is completed. Thereafter, return is made to READY state 150, represented in FIG. 7 by circle 189.

If both the cache 11 and the microcache 18 must be updated, as indicated by the presence of a SetHT signal on lead 193, then START DOUBLE UPDATE CYCLE state 184 is entered. The cache controller 12 then asserts the Cwrite signal, to indicate that a writing cycle has begun, and asserts the WAIT signal to prevent interruption of the memory transfer. In response to the Cwrite and the WAIT signals, the LEAST RECENTLY USED BIT query state 185 is entered. In state 185 the cache controller 12 ascertains the value of the LRU bit 65 in tag and status store 10 (FIG. 3) for the SET.ID associated with this memory word. If the value of the LRU bit is zero, the START NEXT UPDATE CYCLE state 192 is entered and the words of the block transferred from the main memory 14 in much the same way as in states 180–183, responding to a Mwrite signal rather than the Cwrite signal, and storing the information in the microcache 18 instead of the cache store 11. That is, TRANSFER NEXT WORD AND DV BIT state 186 corresponds to state 181, INCREMENT WORD COUNT state 187 corresponds to state 182 and FINISH CACHE UPDATE CYCLE state 188 corresponds to state 183. When the transfer to the microcache 18 is completed, READY state 150 (circle 189) is re-entered to await the next CPU request.

If, in state 185, it is determined that the LRU bit for this location is a one, the START NEXT UPDATE CYCLE state 180 is entered to transfer the block of information to the cache store 11 rather than the microcache store 18. That is, the microcache 18 will be updated only if the LRU bit in the SET.ID location in tag and status store 10 does not contain a "1," indicating that the cache store entry in cache 11 is itself not the least recently used entry. In this case, the microcache 18 is updated instead. If the cache 11 entry is actually the least recently used, this entry is replaced, using the update procedure of states 180-183. In either event, the appropriate entry is overwritten.

While in either of the START UPDATE CYCLE states 180 or 184, the assertion of a CPUwrite will return the system to the START WRITE CYCLE state 151, indicated by circle 190. Similarly, the assertion of a CPUread while in state 180 or state 184 will return the system to the START READ CYCLE state 152, indicated by circle 191. That is, the assertion of a CPUread or CPUwrite will abort an update cycle before each word is transferred, but not during a word transfer.

In FIG. 8 there is shown a state diagram of the windowing procedures used in the adaptive set associative cache architecture of FIGS. 4 and 5. Starting in READY state 150, the assertion of either a CPUread or a CPUwrite causes the system to enter the INCREMENT WINDOW COUNTER state 171. As noted in connection with FIG. 5, the window counter 83 is incremented for the appropriate SET.ID. If the incremented window count does not exceed the window size (comparator 92, FIG. 5), the system returns to the READY state 150 when the CPUread or the CPUwrite signal is removed. If the incremented value in the window counter 83 does match or exceed the window size in window register 96, a Timeup signal is generated, causing the system to enter the START RESET CYCLE state 172. In state 172, the flip-flop 88 is set and, if a MAX signal is received, enters the RESET WINDOW COUNTER state 173. In state 173, window counter 95 is reset and the ResetMAX signal generated to reset the MAX bit 61 in FIG. 3. When the Timeup signal is terminated, the system returns to the INCREMENT WINDOW COUNTER state 171 and thence to READY state 150 when the CPUread or CPUwrite signal terminates.

It should also be clear to those skilled in the art that further embodiments of the present invention may be made by those skilled in the art without departing from the teachings of the present invention.

What is claimed is:

1. A data processing system comprising
   a main memory for storing data and instructions for operating said data processing system,
   a set associative cache memory having a plurality of locations for temporarily storing selected ones of said data and instructions,
   means for temporarily and dynamically increasing a set associativity of at least one of said locations in said cache memory.
   means for counting cache accesses occurring since the most recent increase in the set associativity of said cache memory, and
   means responsive to said access counting means for reducing the set associativity of the most recently increased set associativity.

2. The data processing system according to claim 1 wherein
   said cache memory comprises a direct mapped cache.

3. The data processing system according to claim 1 further comprising
   at least one auxiliary cache memory which can be temporarily assigned to said at least one location to increase the set associativity of that one location.

4. The data processing system according to claim 1 further comprising
   means for counting cache misses for each location in said cache memory, and
   means for increasing the set associativity of a location in said cache memory only if the number of cache misses for that location exceeds a preselected threshold.

5. The data processing system according to claim 1 further comprising
   means for overwriting the least recently used location in said cache memory when a cache miss occurs.

6. A method for operating a data processing system comprising the steps of
   storing data and instructions for operating said data processing system in a main memory,
   temporarily storing selected ones of said data and instructions in a set associative cache memory having a plurality of locations,
   temporarily and dynamically increasing a set associativity of at least one location in said cache memory,
   counting cache accesses occurring since the most recent increase in the set associativity of said cache memory, and
   reducing the set associativity of the most recently increased set associativity in response to the results of said step of counting accesses.

7. The method of operating said data processing system according to claim 6 wherein said step of temporarily storing includes the step of
   directly mapping the locations in said main memory into said cache memory.

8. The method of operating said data processing system according to claim 6 wherein said step of temporarily storing includes the step of
   associating a plurality of locations in said main memory with each location in said cache memory.

9. The method of operating said data processing system according to claim 8 further comprising the step of     temporarily assigning at least one auxiliary cache memory to said at least one location to increase the set associativity of that one location.

10. The method of operating said data processing system according to claim 6 further comprising the steps of     counting cache misses for each location in said cache memory, and     increasing the set associativity of a location in said cache memory only if the number of cache misses for that location exceeds a preselected threshold.

11. The method of operating said data processing system according to claim 8 further comprising the step of     overwriting the least recently used location in said cache memory when a cache miss occurs.

* * * * *